United States Patent
Bae et al.

(10) Patent No.: US 8,964,872 B2
(45) Date of Patent: Feb. 24, 2015

(54) MULTIPLE INPUT MULTIPLE OUTPUT TRANSMISSION METHOD IN A DIGITAL VIDEO BROADCASTING SYSTEM AND DEVICE FOR SUPPORTING SAME

(75) Inventors: Jae Hwui Bae, Daejeon (KR); Gwang Soon Lee, Daejeon (KR); Hyun Lee, Daejeon (KR); Young Su Kim, Daejeon (KR); Bong Ho Lee, Daejeon (KR); Yun Jeong Song, Daejeon (KR); Soo In Lee, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 0 days.

(21) Appl. No.: 13/877,538

(22) PCT Filed: Oct. 4, 2011

(86) PCT No.: PCT/KR2011/007304
§ 371 (c)(1),
(2), (4) Date: Apr. 3, 2013

(87) PCT Pub. No.: WO2012/046987
PCT Pub. Date: Apr. 12, 2012

(65) Prior Publication Data
US 2013/0195158 A1 Aug. 1, 2013

(30) Foreign Application Priority Data

Oct. 5, 2010 (KR) .................. 10-2010-0096707
Feb. 8, 2011 (KR) .................. 10-2011-0010865

(51) Int. Cl.
| H04L 1/02 | (2006.01) |
| H04B 7/04 | (2006.01) |
| H04L 5/00 | (2006.01) |
| H04L 27/00 | (2006.01) |

(Continued)

(52) U.S. Cl.
CPC ............ *H04B 7/0456* (2013.01); *H04L 5/0023* (2013.01); *H04L 27/0008* (2013.01); *H04L 27/206* (2013.01); *H04L 27/367* (2013.01)
USPC .......................................... 375/267

(58) Field of Classification Search
USPC ......... 375/267, 260, 298, 299, 308, 347, 349; 455/69, 101
See application file for complete search history.

(56) References Cited

U.S. PATENT DOCUMENTS 7,627,051 B2 * 12/2009 Shen et al. ..................... 375/267
8,155,231 B2 * 4/2012 Jang et al. ..................... 375/267

(Continued)

OTHER PUBLICATIONS

International Search Report issued Apr. 4, 2012 in International Patent Application No. PCT/KR2011/007304 (3 pages, in Korean).

(Continued)

*Primary Examiner* — Khai Tran
(74) *Attorney, Agent, or Firm* — NSIP Law

(57) ABSTRACT

Provided is a Multiple Input Multiple Output (MIMO) transmission method in a digital broadcasting system. The method includes generating a plurality of first modulation symbols by modulating first information bits; generating a plurality of second modulation symbols by modulating second information bits; generating a plurality of first pre-coded symbols and a plurality of second pre-coded symbols by pre-coding the plurality of first modulation symbols and the plurality of second modulation symbols; and allocating the plurality of first pre-coded symbols and the plurality of second pre-coded symbols staggeringly through a first antenna and a second antenna and transmitting them.

10 Claims, 6 Drawing Sheets

(51) Int. Cl.
*H04L 27/20* (2006.01)
*H04L 27/36* (2006.01)

(56) References Cited

U.S. PATENT DOCUMENTS

2007/0140100 A1 6/2007 Ouyang et al.

2008/0267317 A1 10/2008 Malladi et al.

OTHER PUBLICATIONS

Jafar, Syed A. "Exploiting Channel Correlations—Simple Interference Alignment Schemes with no CSIT", University of California Irvine, Oct. 5, 2009, arXiv:0910.0555v1 (18 pages, in English).

* cited by examiner (a)

(b)

MULTIPLE INPUT MULTIPLE OUTPUT TRANSMISSION METHOD IN A DIGITAL VIDEO BROADCASTING SYSTEM AND DEVICE FOR SUPPORTING SAME

CROSS REFERENCE TO RELATED APPLICATION(S)

This application is a National Phase entry of PCT Application No. PCT/KR2011/007304, filed on Oct. 4, 2011, which claims priority under 35 U.S.C. §119(e) and 365(c) to Korean Patent Application No. 10-2010-0096707, filed on Oct. 5, 2010, and Korean Patent Application No. 10-2011-0010865, filed on Feb. 8, 2011, the entire disclosures of each of which are incorporated herein by reference for all purposes.

TECHNICAL FIELD

The present invention relates to a digital broadcasting system, and more particularly, to a multiple antenna transmission method in a digital broadcasting system and an apparatus supporting the method.

BACKGROUND ART

Among wireless communication technologies, a multiple input multiple output (MIMO) transmission method, which is a multi-antenna technology, has been prominent. The MIMO applied to wireless communication provides a method capable of transceiving data (that may be referred to as a packet or a frame according to a technical field) using multiple antennas between a transmitter and a receiver.

Indices of determining performance of a wireless communication system may be a data throughput and a link range. The MIMO transmission method may improve a data throughput and a link range of wireless communication without an increase in a bandwidth of a usable frequency and a transmission power for data transmission. This MIMO transmission has been supported in IEEE 802.11n, 3GPP long term evolution (LTE), WiMAX, HSPA+, or the like. The tendency to apply the MIMO transmission to a digital video broadcasting (DVB) system has currently appeared.

The MIMO transmission may cause deterioration in performance in a channel environment in which correlation is generated in transmitting and receiving antennas. The existing MIMO transmission has been applied to a mobile communication system. In the case of the mobile communication system, since channel values between the transmitting and receiving antennas are designed on the assumption that they are independent from each other, the deterioration in performance due to the MIMO transmission has not been largely problematic. However, unlike the mobile communication system, in the case of the broadcasting system, the probability that correlation values will be generated between transmitting and receiving antennas increases. Therefore, when the existing spatial multiplexing scheme of MIMO transmission method is used under the channel situation of the broadcasting system described above, significant deterioration in performance may be generated. Therefore, a need exists for an improved MIMO transmission method for alleviating deterioration in performance at the time of MIMO transmission in a broadcasting system.

DISCLOSURE

Technical Problem

The present invention provides a method for transmitting an improved MIMO transmission method in a digital broadcasting system and a digital broadcasting device.

Technical Solution

In an aspect, a multiple input multiple output (MIMO) transmission method in a digital broadcasting system is provided. The method comprises generating a plurality of first modulated symbols by modulating first information bits, generating a plurality of second modulated symbols by modulating second information bit, generating a plurality of first precoded symbols and a plurality of second precoded symbols by precoding the plurality of first modulated symbols and the plurality of second modulated symbols, and staggering and transmitting each of the plurality of first precoded symbols and each of the plurality of second precoded symbols through first and second antennas.

Each of the plurality of first modulated symbols and the plurality of second modulated symbols may be modulated in one of a quadrature phase shift keying (QPSK) scheme and a quadrature amplitude modulation (QAM) scheme.

The plurality of first modulated symbols and the plurality of second modulated symbols may be modulated in different schemes.

The plurality of first precoded symbols and the plurality of second precoded symbols may be precoded based on different precoding matrices according to modulation schemes applied to each of the plurality of first modulated symbols and the plurality of second modulated symbols.

The precoding matrix θ may be represented by the following Equation:

$$\Theta = \frac{1}{\sqrt{1+a^2}} \begin{bmatrix} 1 & a \\ a & -1 \end{bmatrix}$$

$$a = \begin{cases} \sqrt{2}+1, & \text{for } QPSK \text{ and } QPSK \\ (\sqrt{2}+3+\sqrt{5})/(\sqrt{2}+3-\sqrt{5}), & \text{for } QPSK \text{ and } 16QAM \\ (\sqrt{2}+4)/(\sqrt{2}+2), & \text{for } 16QAM \text{ and } 16QAM. \end{cases}$$

When the plurality of first precoded symbols are (r11, r12, r13, r14) and the plurality of second precoded symbols are (r21, r22, r23, r24), (r11, r22, r23, r14) may be sequentially transmitted through the first antenna and (r21, r12, r13, r24) may be sequentially transmitted through the second antenna.

In another aspect, a digital broadcasting device is provided. The device comprises a processor and a transceiver functionally connected to the processor to thereby transmit and receive signals. The process is set to generate a plurality of first modulated symbols by modulating first information bits, generate a plurality of second modulated symbols by modulating second information bits, generate a plurality of first precoded symbols and a plurality of second precoded symbols by precoding the plurality of first modulated symbols and the plurality of second modulated symbols, and stagger and transmit each of the plurality of first precoded symbols and each of the plurality of second precoded symbols through first and second antennas.

Each of the plurality of first modulated symbols and the plurality of second modulated symbols may be modulated in one of a QPSK scheme and a QAM scheme.

The plurality of first modulated symbols and the plurality of second modulated symbols may be modulated in different schemes.

The plurality of first precoded symbols and the plurality of second precoded symbols may be precoded based on different precoding matrices according to modulation schemes applied to each of the plurality of first modulated symbols and the plurality of second modulated symbols.

The precoding matrix θ may be represented by the following Equation:

$$\Theta = \frac{1}{\sqrt{1+a^2}} \begin{bmatrix} 1 & a \\ a & -1 \end{bmatrix}$$

$$a = \begin{cases} \sqrt{2}+1, & \text{for } QPSK \text{ and } QPSK \\ (\sqrt{2}+3+\sqrt{5})/(\sqrt{2}+3-\sqrt{5}), & \text{for } QPSK \text{ and } 16QAM \\ (\sqrt{2}+4)/(\sqrt{2}+2), & \text{for } 16QAM \text{ and } 16QAM. \end{cases}$$

When the plurality of first precoded symbols are (r11, r12, r13, r14) and the plurality of second precoded symbols are (r21, r22, r23, r24), (r11, r22, r23, r14) may be sequentially transmitted through the first antenna and (r21, r12, r13, r24) may be sequentially transmitted through the second antenna.

Advantageous Effects

According to the embodiments of the present invention, the precoded transmission signals input to the amplifiers are staggered and transmitted through each transmitting antenna, such that the signals input to the amplifiers for each antenna has the same or similar average power. Through this process, the same average power is applied to the amplifiers, such that the average output powers of the amplifiers have the same or similar value and the output signals of two transmitting antennas have the same power. Therefore, the transmission signals of two transmitting antennas have the same reception range.

MODE FOR INVENTION

Figure 1:
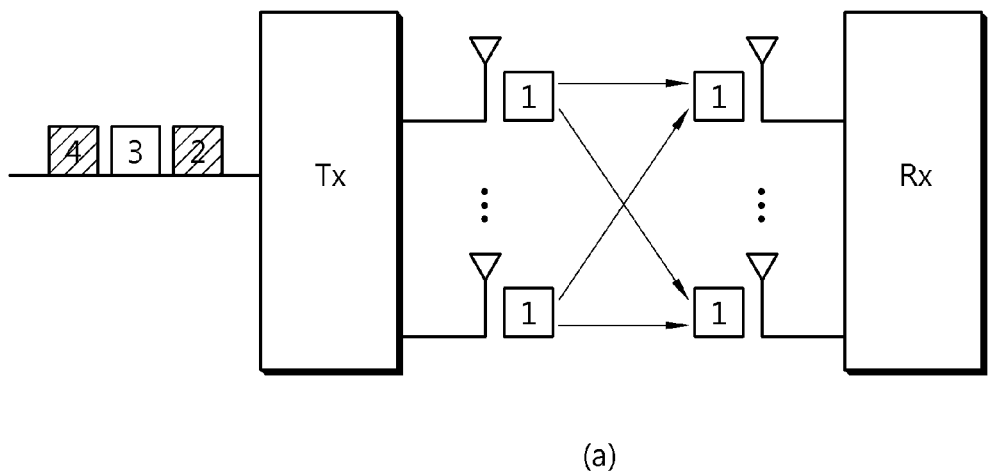
FIGS. 1A and 1B are diagrams showing a multiple input multiple output (MIMO) method that may be applied to an embodiment of the present invention.
Figure 1:
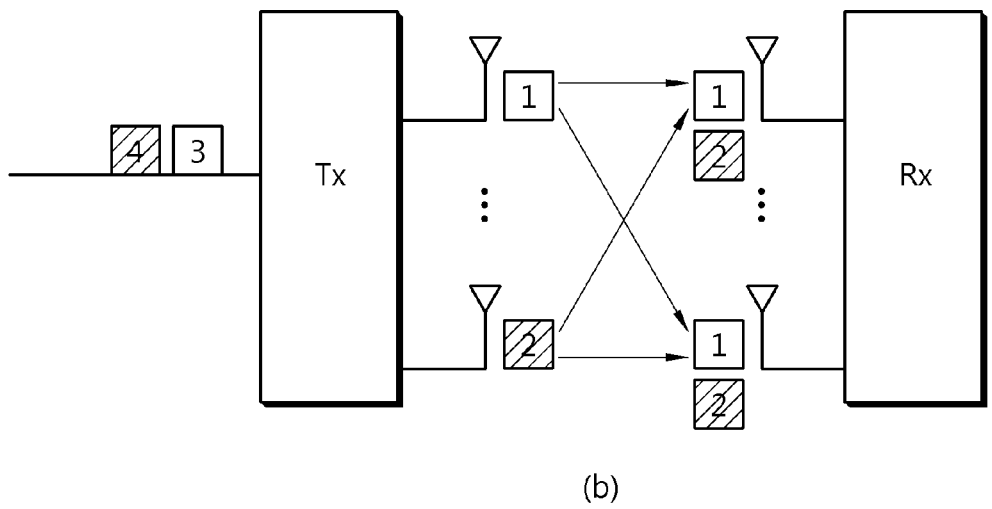

Hereinafter, embodiments of the present invention will be described in detail with reference to the accompanying drawings so that those skilled in the art may easily practice the present invention. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification.

Throughout the present specification, unless explicitly described to the contrary, "comprising" any components will be understood to imply the inclusion of other elements rather than the exclusion of any other elements. A term "part", "module", "unit", or the like, described in the specification means a unit of processing at least one function or operation and may be implemented by hardware or software or a combination of hardware and software.

FIGS. 1A and 1B are diagrams showing a multiple input multiple output (MIMO) method that may be applied to an embodiment of the present invention. FIG. 1A shows a spatial diversity scheme of MIMO transmission method; and FIG. 1B shows a spatial multiplexing scheme of MIMO transmission method.

Referring to FIG. 1A, a transmitting end $T_x$ includes two transmitting antennas, and a receiving end $R_x$ includes two receiving antennas. The transmitting end performs precoding so as to map the same data having a bit stream format to both of the transmitting antennas and performs beamforming and MIMO transmission, in performing the MIMO transmission. Therefore, the receiving end may receive signals passing through MIMO radio channels through the two antennas and select signals less affected by fading among the received signals or synthetically receive signals based on the received signals to thereby obtain original data.

In the case of the spatial diversity scheme of MIMO transmission, signals received from antennas spaced apart from each other are subjected to different phase changes, such that they have low correlation with each other. As a result, two signals are independent from each other with respect to multipath fading. Therefore, when one of the two signals is significantly affected by fading, the possibility that the other of the two signals will be weakly affected by the fading is high. Accordingly, when the two signals are synthesized, a signal having less multi-path fading may be obtained. Although the spatial diversity scheme of MIMO transmission does not improve a data rate in data transmission, it may improve reliability of the transmission by a diversity gain.

Referring to FIG. 1B, a transmitting end $T_x$ includes two transmitting antennas, and a receiving end $R_x$ includes two receiving antennas. The transmitting end performs precoding so as to map different bit streams to each transmitting antenna and performs beamforming and MIMO transmission, in performing the MIMO transmission. Therefore, the receiving end may receive signals passing through MIMO radio channels through the two antennas and simultaneously obtain independent data streams since each of the received signals is a signal for an independent bit stream.

The spatial multiplexing scheme of MIMO transmission may increase channel capacity in a high signal to noise ratio (SNR). However, although the spatial multiplexing scheme of MIMO transmission may improve the entire data rate in the case in which channels used for wireless signal transmission have characteristics independent from each other, it may cause deterioration in performance in the case in which the channels used for wireless signal transmission are highly or fully correlated channels.

Figure 2:
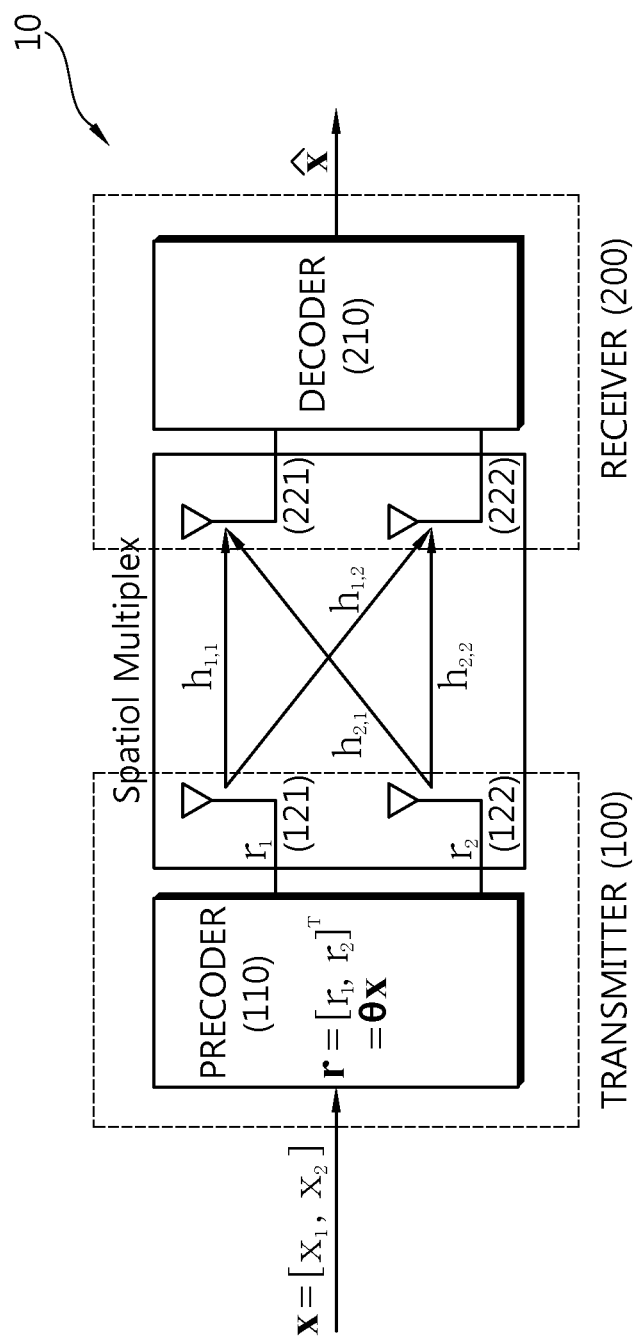
FIG. 2 is a diagram showing an example of an MIMO transceiving system that may be applied to the embodiment of the present invention.

FIG. 2 is a diagram showing an example of an MIMO transceiving system that may be applied to the embodiment of the present invention. The MIMO transceiving system shown in FIG. 2 may be applied in order to improve deterioration in performance that may be caused at the time of applying MIMO in a correlated fading channel environment such as a digital broadcasting system. This MIMO transceiving system may be applied to digital video broadcasting-next generation handheld (DVB-NGH).

Although the MIMO transceiving system shown in FIG. 2 is a 2×2 MIMO system including two transmitter antennas and two receiver antennas, it may also include a plurality of transmitting antennas and/or a plurality of receiving antennas. However, for convenience of explanation of the present invention, a case in which the number of each of transmitting antennas and receiving antennas is 2 will be described by way of example.

Referring to FIG. 2, in the MIMO transceiving system 10, two transmission signals in an input signal vector $x=[x_1, x_2]^T$ that a transmitter 100 is to transmit are input in a precoder 110. Two transmission signals may be signals modulated by a specific modulation scheme. In addition, the transmission signals $x_1$ and $x_2$ may be modulated orthogonal frequency division multiplex (OFDM) symbols. However, hereinafter, $x_1$ and $x_2$ will be referred to as transmission signals for convenience of explanation.

The precoder 110 precodes the transmission signals $x_1$ and $x_2$ so as to be able to be transmitted in the MIMO scheme. This may be represented by precoded transmission signals $r=[r_1, r_2]^T$. A precoding matrix $\theta$ used for precoding may be varied according to the number of each of transmitter antennas and receiver antennas that are included in the MIMO system. In the system of FIG. 2, a 2×2 matrix may be used. The precoding by the precoder 110 may be varied according to the MIMO transmission scheme. In the case of the MIMO transmission using the spatial diversity scheme, since the transmission signals $x_1$ and $x_2$ need to be allocated to transmitting antennas, respectively, the precoded transmission signal $r_1$ includes a signal associated with the transmission signals $x_1$ and $x_2$ and the precoded transmission signal $r_2$ includes a signal associated with the transmission signals $x_1$ and $x_2$.

Matrix components configuring the precoding matrix may be changed according to a scheme in which output signals finally transmitted from the transmitting antennas 121 and 122 of the transmitter 100 are modulated, that is, in a scheme in which the transmission signals $x_1$ and $x_2$ are modulated. As an example, the matrix components may be represented by the following Equation 1.

$$\Theta = \frac{1}{\sqrt{1+a^2}} \begin{bmatrix} 1 & a \\ a & -1 \end{bmatrix}$$

$$a = \begin{cases} \sqrt{2}+1, & \text{for QPSK and QPSK} \\ (\sqrt{2}+3+\sqrt{5})/(\sqrt{2}+3-\sqrt{5}), & \text{for QPSK and 16 QAM} \\ (\sqrt{2}+4)/(\sqrt{2}+2), & \text{for 16 QAM and 16 QAM} \end{cases}$$

[Equation 1]

The precoded transmission signals may be amplified by an amplifier and then transmitted through the transmitting antennas 121 and 122, and output signals transmitted from the transmitting antennas may be mapped and transmitted to a plurality of space streams. The relationship between the plurality of space streams between the transmitting antennas 121 and 122 of the transmitter 100 and receiving antennas 221 and 222 of a receiver 200 may be represented by an effective channel matrix, which may be simply represented by $h_{11}$, $h_{12}$, $h_{21}$, and $h_{22}$. However, since it departs from the spirit and scope of the present invention, a detailed description thereof will be omitted.

The receiving antennas 221 and 222 on the receiver 200 side receive the output signals transmitted from the transmitter 100, and the received signals y are decoded by a decoder 210. The receiver 120 may obtain an original input signal x through the above-mentioned process.

Figure 3:
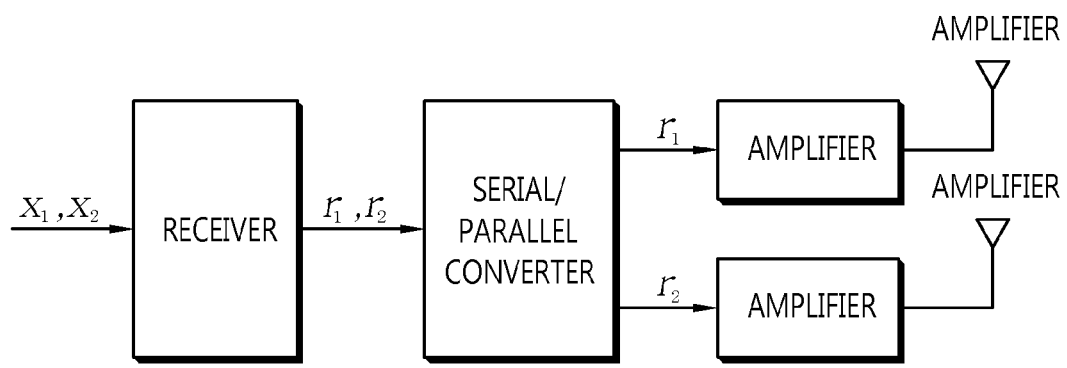
FIG. 3 is a block diagram showing a process in which a transmitter performing MIMO transmission processes signals.

FIG. 3 is a block diagram showing a process in which a transmitter performing MIMO transmission processes signals.

Referring to FIG. 3, the transmission signals $x_1$ and $x_2$ are input into the precoder and then precoded by the precoder for MIMO transmission. The transmission signal $r_1$ and $r_2$ precoded by the precoder are sequentially converted into parallel transmission signals by a serial/parallel converter. Therefore, each of the precoded transmission signals may be mapped to specific antennas so as to be able to be transmitted in a spatial multiplexing MIMO scheme. The precoded transmission signals are amplified through high power amplifiers (HPAs) and then transmitted as output signals through the antennas.

Transmission powers of the transmitting antennas may have a predetermined value ($E\{\|x\|^2=1\}$). Therefore, the transmission signals have the same transmission power.

The transmission signals to be transmitted through the two transmitting antennas may be modulated in the same modulation scheme. In this case, a 16 quadrature amplitude modulation scheme may be applied. When the same modulation scheme is applied to the transmission signals in the two transmitting antennas, the transmission signals of each antenna have the same peak-to-average power ratio (PAPR) values. Therefore, since the two signals have the same transmission power, the transmission signals of the two antennas after passing through the amplifiers have the same reception range.

On the other hand, each of the two transmission signals transmitted through the two transmitting antennas may be modulated in different modulation schemes. In this case, a quadrature phase shift keying (QPSK) modulation scheme may be applied to the transmission signal in one transmitting antenna, and a 16 QAM modulation scheme may be applied to the transmission signal in the other transmitting antenna. When different modulation schemes are applied to the signals transmitted through the transmitting antennas, the transmission signals of each antenna may have different PAPRs. Therefore, even though the two transmission signals have the same power, operation ranges of the amplifiers for the two transmission signals are different, such that the transmission signals of the two antennas after passing through the amplifiers have different powers. This may cause transmission ranges of transmitter output signals to be different.

When the modulation schemes for the transmission signals between the transmitting antennas are different in the MIMO transceiving system as described above, even though the signals input to the amplifiers have the same power, the PAPR values of each signal become different, such that the amplifier output signals have different powers. Therefore, a problem that the transmission ranges of each transmission signals become different occurs. In order to solve this problem, a method of allowing PAPR values of transmission signals to be equal to each other, such that amplifier output signals have the same transmission power value will be described.

Figure 4:
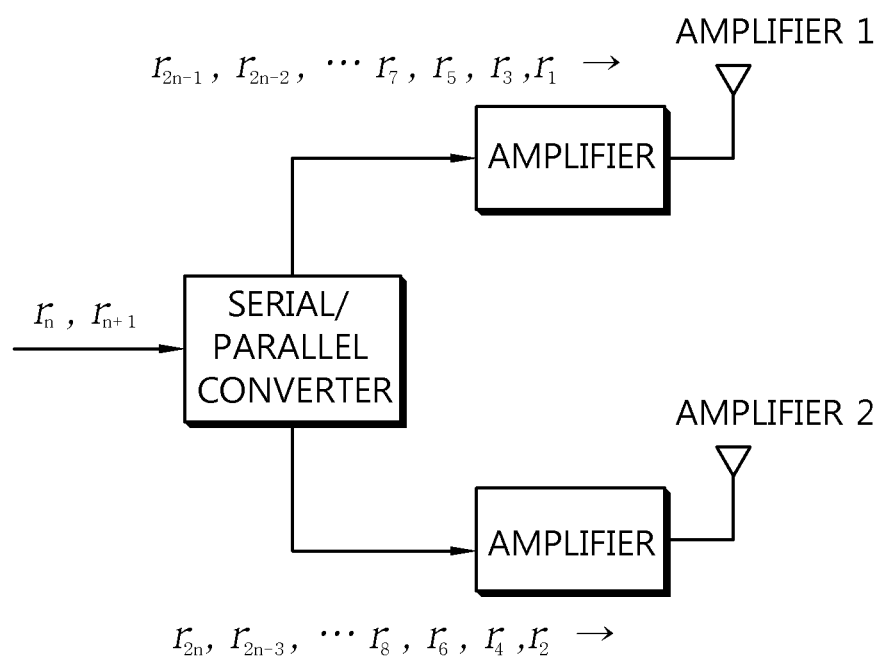
FIG. 4 is a diagram showing a method for transmitting a signal in MIMO transmission.

FIG. 4 is a diagram showing a method for transmitting a signal in MIMO transmission.

Referring to FIG. 4, the precoded transmission signals input to the serial/parallel converter may be represented by a general equation $(r_n, r_{n+1})$.

The precoded transmission signals may be sequentially allocated to an antenna 1 and an antenna 2, be amplified while passing through the amplifiers, and be transmitted as output signals through the antennas to which they are allocated.

The final transmission signals transmitted through each transmitting antenna may be represented by the following Equation 2.

$$t = t_1 : (ant1, ant2) = (r_1, r_2) \Leftarrow (x_1, x_2)$$
$$t = t_2 : (ant1, ant2) = (r_3, r_4) \Leftarrow (x_3, x_4)$$
$$t = t_3 : (ant1, ant2) = (r_5, r_6) \Leftarrow (x_5, x_6)$$
$$t = t_2 : (ant1, ant2) = (r_7, r_8) \Leftarrow (x_7, x_8)$$
$$\vdots$$
$$t = t_n : (ant1, ant2) = (r_{2n-1}, r_{2n}) \Leftarrow (x_{2n-1}, x_{2n})$$

[Equation 2]

Here, the transmission signals $x_1$ and $x_2$ to be transmitted from the antenna 1 and the antenna 2 have the same power value but may be modified in different modulation schemes. Therefore, the precoded signals $r_1$ and $r_2$ have the same transmission power but may have different PAPR values due to a difference between modulation schemes. Therefore, the output signals amplified by the amplifiers have different transmission power values, such that the two signals have different transmission ranges.

A difference between PAPR values occurring due to the difference between modulation schemes for the transmission signals described above causes a difference between amplification degrees that may be obtained by the amplifiers. Therefore, the transmission powers of the signals transmitted through the two antennas in output ends of the amplifiers become different, such that the transmission ranges of the two transmission signals become different. In order to solve this problem, it is required to make the PAPR values of the signals input to the amplifiers equal to each other. This may be solved by a method of staggering and inputting the precoded transmission signals to each of the amplifiers in a sequence. A detailed description thereof will be provided with reference to FIG. 5.

Figure 5:
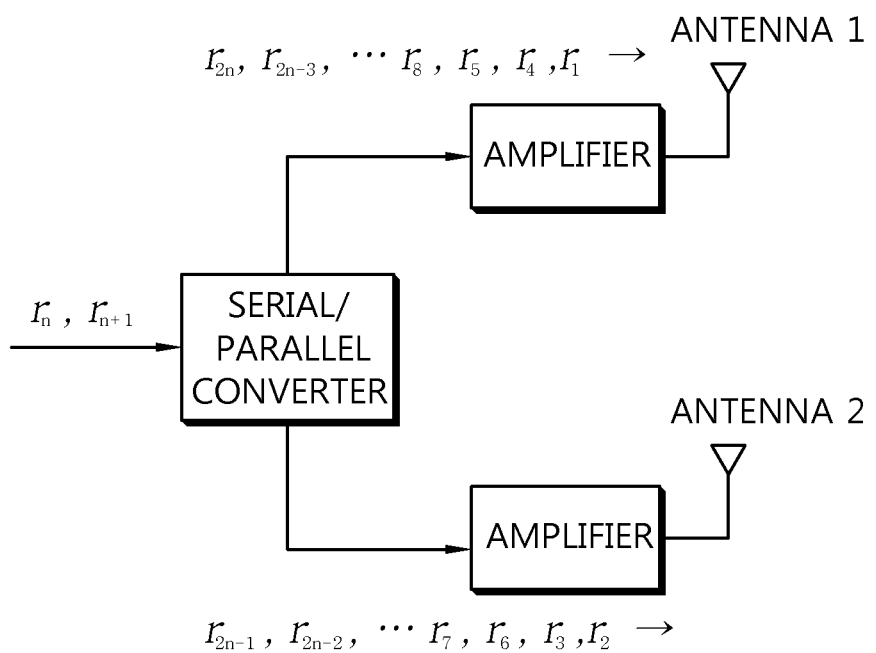
FIG. 5 is a diagram showing an MIMO transmission method according to an embodiment of the present invention.

FIG. 5 is a diagram showing an MIMO transmission method according to an embodiment of the present invention. Here, a 2×2 MIMO transmission system using a spatial multiplexing scheme will be described by way of example. In addition, a case in which a transmission signal transmitted to an antenna 1 is modulated in a 16 QAM modulation scheme and a transmission signal transmitted to an antenna 2 is modulated in a QPSK modulation scheme will be described by way of example.

Referring to FIG. 5, each of $r_{2n-1}$ and $r_{2n}$ is formed by a combination of the transmission signals modified in the QPSK scheme and modified in the 16 QAM scheme through the precoding process. Since each of $r_{2n-1}$ and $r_{2n}$ include different magnitude values of QPSM and 16 QAM components, each of $r_{2n-1}$ and $r_{2n}$ have different PAPR values.

With respect to the signals input to the amplifiers before the output signals of the antenna 1 and the antenna 2 are amplified, each of the transmission signals $r_{2n-1}$ and $r_{2n}$ precoded by the precoder is staggered and input to the amplifiers connected to each antenna. Each of $r_{2n-1}$ and $r_{2n}$, which are output signals of the precoder, is staggered and input to the amplifiers connected to the two transmitting antennas per unit time, such that each of different modulated signals is staggered and input to the amplifiers. The signals transmitted through each antenna per unit time may be represented by the following Equation 3.

$$t = t_1 : (ant1, ant2) = (r_1, r_2) \Leftarrow (x_1, x_2)$$
$$t = t_2 : (ant1, ant2) = (r_4, r_3) \Leftarrow (x_4, x_3)$$
$$t = t_3 : (ant1, ant2) = (r_5, r_6) \Leftarrow (x_5, x_6)$$
$$t = t_4 : (ant1, ant2) = (r_8, r_7) \Leftarrow (x_8, x_7)$$
$$\vdots$$
$$t = t_{n-1} : (ant1, ant2) = (r_{2n-3}, r_{2n-2}) \Leftarrow (x_{2n-3}, x_{2n-2})$$
$$t = t_n : (ant1, ant2) = (r_{2n}, r_{2n-1}) \Leftarrow (x_{2n}, x_{2n-1})$$

[Equation 3]

Through this process, the average PAPRs of the signals input to the two amplifiers have the same value. Therefore, the transmission signals to be transmitted through the two transmitting antennas, that is, the antenna 1 and the antenna 2 may have the same amplification degrees through the amplifiers having the same feature, and the output signals of the amplifiers may have the same power value. Accordingly, the reception ranges of the transmission signals of each antenna may have the same magnitude.

Figure 6:
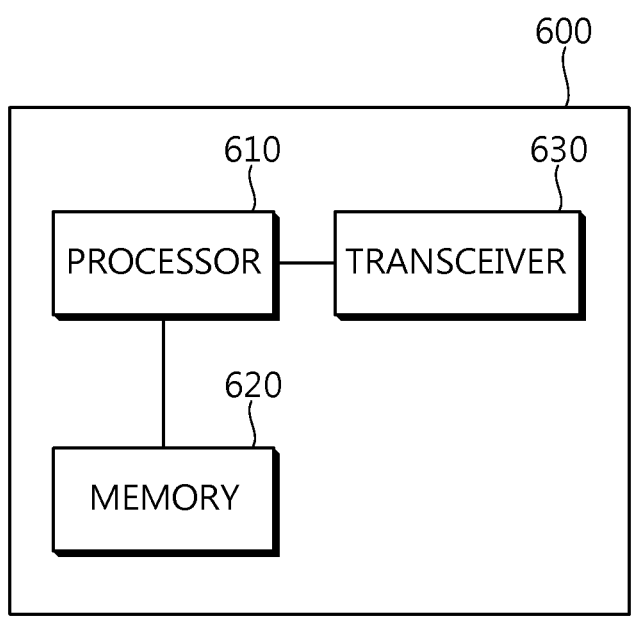
FIG. 6 is a block diagram showing a wireless device to which the embodiment of the present invention may be applied.

FIG. 6 is a block diagram showing a wireless device to which the embodiment of the present invention may be applied. The wireless device may be a general wireless mobile communication device, or be a wireless device used in a digital video broadcasting or be included in the wireless device used in the digital video broadcasting.

Referring to FIG. 6, the wireless device 600 includes a processor 610, a memory 620, and a transceiver 630. The transceiver 630 may transmit and/or receive wireless signals and include a plurality of antennas for MIMO transmission. The processor 610 is functionally connected to the transceiver 630 to thereby be set to implement the MIMO transceiving method for MIMO transmission shown in FIGS. 2 to 5 and implement operations for processing transmission signals, such as modulation, demodulation, interleaving, mapping, and the like.

The processors 610 and/or the transceiver 630 may include an application-specific integrated circuit (ASIC), other chipsets, logical circuits, and/or data processing devices. When the embodiment is implemented by software, the above-mentioned method may be implemented by a module (process, function, or the like) that performs the above-mentioned function. The module may be stored in the memory 620 and be performed by the processor 610. The memory 620 may be included inside the processor 610 and may be separately disposed outside the process 610 and be functionally connected to the processor 610 by widely known various units.

The invention claimed is:

1. A multiple input multiple output (MIMO) transmission method in a digital broadcasting system comprising:
   generating a plurality of first modulated symbols by modulating first information bits;
   generating a plurality of second modulated symbols by modulating second information bits;
   generating a plurality of first precoded symbols and a plurality of second precoded symbols by precoding the plurality of first modulated symbols and the plurality of second modulated symbols; and staggering and transmitting each of the plurality of first precoded symbols and each of the plurality of second precoded symbols through first and second antennas, wherein the plurality of first precoded symbols and the plurality of second precoded symbols are precoded based on different precoding matrices according to modulation schemes applied to each of the plurality of first modulated symbols and the plurality of second modulated symbols.

2. The MIMO transmission method of claim 1, wherein each of the plurality of first modulated symbols and the plurality of second modulated symbols is modulated in one of a quadrature phase shift keying (QPSK) scheme and a quadrature amplitude modulation (QAM) scheme.

3. The MIMO transmission method of claim 2, wherein the plurality of first modulated symbols and the plurality of second modulated symbols are modulated in different schemes.

4. The MIMO transmission method of claim 1, wherein the precoding matrix θ is represented by the following Equation:

$$\Theta = \frac{1}{\sqrt{1+a^2}} \begin{bmatrix} 1 & a \\ a & -1 \end{bmatrix}$$

$$a = \begin{cases} \sqrt{2}+1, & \text{for } QPSK \text{ and } QPSK \\ (\sqrt{2}+3+\sqrt{5})/(\sqrt{2}+3-\sqrt{5}), & \text{for } QPSK \text{ and } 16QAM \\ (\sqrt{2}+4)/(\sqrt{2}+2), & \text{for } 16QAM \text{ and } 16QAM. \end{cases}$$

5. A multiple input multiple output (MIMO) transmission method in a digital broadcasting system comprising:

generating a plurality of first modulated symbols by modulating first information bits;

generating a plurality of second modulated symbols by modulating second information bits;

generating a plurality of first precoded symbols and a plurality of second precoded symbols by precoding the plurality of first modulated symbols and the plurality of second modulated symbols; and staggering and transmitting each of the plurality of first precoded symbols and each of the plurality of second precoded symbols through first and second antennas, wherein when the plurality of first precoded symbols are (r11, r12, r13, r14) and the plurality of second precoded symbols are (r21, r22, r23, r24), (r11, r22, r23, r14) are sequentially transmitted through the first antenna and (r21, r12, r13, r24) are sequentially transmitted through the second antenna.

6. A digital broadcasting device comprising:

a processor; and a transceiver functionally connected to the processor to thereby transmit and receive signals, wherein the process is set to:

generate a plurality of first modulated symbols by modulating first information bits;

generate a plurality of second modulated symbols by modulating second information bits;

generate a plurality of first precoded symbols and a plurality of second precoded symbols by precoding the plurality of first modulated symbols and the plurality of second modulated symbols; and stagger and transmit each of the plurality of first precoded symbols and each of the plurality of second precoded symbols through first and second antennas, wherein the plurality of first preceded symbols and the plurality of second preceded symbols are precoded based on different precoding matrices according to modulation schemes applied to each of the plurality of first modulated symbols and the plurality of second modulated symbols.

7. The digital broadcasting device of claim 6, wherein each of the plurality of first modulated symbols and the plurality of second modulated symbols is modulated in one of a QPSK scheme and a QAM scheme.

8. The digital broadcasting device of claim 7, wherein the plurality of first modulated symbols and the plurality of second modulated symbols are modulated in different schemes.

9. The digital broadcasting device of claim 6, wherein the precoding matrix θ is represented by the following Equation:

$$\Theta = \frac{1}{\sqrt{1+a^2}} \begin{bmatrix} 1 & a \\ a & -1 \end{bmatrix}$$

$$a = \begin{cases} \sqrt{2}+1, & \text{for } QPSK \text{ and } QPSK \\ (\sqrt{2}+3+\sqrt{5})/(\sqrt{2}+3-\sqrt{5}), & \text{for } QPSK \text{ and } 16QAM \\ (\sqrt{2}+4)/(\sqrt{2}+2), & \text{for } 16QAM \text{ and } 16QAM. \end{cases}$$

10. A digital broadcasting device comprising:

a processor; and a transceiver functionally connected to the processor to thereby transmit and receive signals, wherein the process is set to:

generate a plurality of first modulated symbols by modulating first information bits;

generate a plurality of second modulated symbols by modulating second information bits;

generate a plurality of first precoded symbols and a plurality of second precoded symbols by preceding the plurality of first modulated symbols and the plurality of second modulated symbols; and stagger and transmit each of the plurality of first precoded symbols and each of the plurality of second precoded symbols through first and second antennas, wherein when the plurality of first precoded symbols are (r11, r12, r13, r14) and the plurality of second precoded symbols are (r21, r22, r23, r24), (r11, r22, r23, r14) are sequentially transmitted through the first antenna and (r21, r12, r13, r24) are sequentially transmitted through the second antenna.

\* \* \* \* \*